United States Patent
Notcutt et al.

(10) Patent No.: US 7,469,454 B2
(45) Date of Patent: Dec. 30, 2008

(54) MOUNTING SYSTEM FOR OPTICAL FREQUENCY REFERENCE CAVITIES

(75) Inventors: Mark Notcutt, Boulder, CO (US); John L. Hall, Boulder, CO (US); Long-Sheng Ma, Shanghai (CN)

(73) Assignees: Regents of the University of Colorado, Boulder, CO (US); The United States of America as represented by the Secretary of Commerce, the National Institute of Standards and Technology, Washington, DC (US)

( * ) Notice: Subject to any disclaimer, the term of this patent is extended or adjusted under 35 U.S.C. 154(b) by 203 days.

(21) Appl. No.: 11/510,269

(22) Filed: Aug. 25, 2006

(65) Prior Publication Data

US 2007/0091975 A1    Apr. 26, 2007

Related U.S. Application Data

(60) Provisional application No. 60/711,955, filed on Aug. 25, 2005, provisional application No. 60/713,834, filed on Sep. 2, 2005.

(51) Int. Cl.
    *G02F 1/21* (2006.01)
    *G01B 9/02* (2006.01)
(52) U.S. Cl. .................. 29/33 R; 29/447; 372/33; 372/107
(58) Field of Classification Search ............. 29/33 R, 29/447, 888.043; 372/20, 24, 33, 103, 105, 372/107; 250/201.3, 216, 234; 356/452, 356/480; 73/724; 385/15; 438/171; 359/894
See application file for complete search history.

(56) References Cited

U.S. PATENT DOCUMENTS 3,894,795 A * 7/1975 Laurens ................. 359/894

(Continued)

OTHER PUBLICATIONS

Hall, J. L. et al, "Improving laser coherence," book from the International Conference on Laser Spectroscopy XVIII (2005) held at Aviemore, Scotland, E. Hinds, A. Ferguson and E. Riis, Educators, p. 3, published by World Scientific, Singapore. Paper sent to the Examiner was prior to publication.**

(Continued)

*Primary Examiner*—Dana Ross
(74) *Attorney, Agent, or Firm*—Jennifer L. Bales; Macheledt Bales & Heidmiller LLP

(57) ABSTRACT

A technique for reducing the vibration sensitivity of laser-stabilizing optical reference cavities is based upon an improved design and mounting method for the cavity, wherein the cavity is mounted vertically. It is suspended at one plane, around the spacer cylinder, equidistant from the mirror ends of the cavity. The suspension element is a collar of an extremely low thermal expansion coefficient material, which surrounds the spacer cylinder and contacts it uniformly. Once the collar has been properly located, it is cemented in place so that the spacer cylinder is uniformly supported and does not have to be squeezed at all. The collar also includes a number of cavities partially bored into its lower flat surface, around the axial bore. These cavities are support points, into which mounting base pins will be inserted. Hence the collar is supported at a minimum of three points.

27 Claims, 3 Drawing Sheets

U.S. PATENT DOCUMENTS

| | | | | |
|---|---|---|---|---|
| 4,081,765 | A | * | 3/1978 | Berg et al. .................... 372/24 |
| 4,426,155 | A | * | 1/1984 | Monchalin .................. 356/452 |
| H001813 | H | * | 11/1999 | Kersey ........................ 372/94 |
| 6,603,560 | B1 | * | 8/2003 | Islam ......................... 356/480 |
| 6,661,941 | B1 | * | 12/2003 | Yao ............................. 385/15 |
| 6,845,108 | B1 | * | 1/2005 | Liu et al. ..................... 372/20 |
| 6,847,029 | B2 | * | 1/2005 | Hill ............................ 250/216 |
| 2002/0061613 | A1 | * | 5/2002 | Sano et al. ................. 438/171 |
| 2004/0263857 | A1 | * | 12/2004 | Basavanhally et al. ...... 356/480 |

OTHER PUBLICATIONS

Notcutt, M. et al, "Simple and compact 1-Hz laser system via an improved mounting configuration of a reference cavity," Optics Letters, Jul. 15, 2005, vol. 30, No. 14.

Notcutt, M. et al, "Cryogenic system for a sapphire Fabry-Perot optical frequency standard," Cryogenics, 1996, pp. 13-16, vol. 36, No. 1.

Chen, L. et al, "Vibration-induced elastic deformation of Fabry-Perot cavities," Physical Review, 2006, pp. 1-13, vol. 74, No. 053801.

Nazarova, T. et al, "Vibration-insensitive reference cavity for an ultra-narrow-linewidth laser," Applied Physics B: Lasers and Optics, 2006, pp. 531-536.

* cited by examiner

Figure 1A (Prior Art)
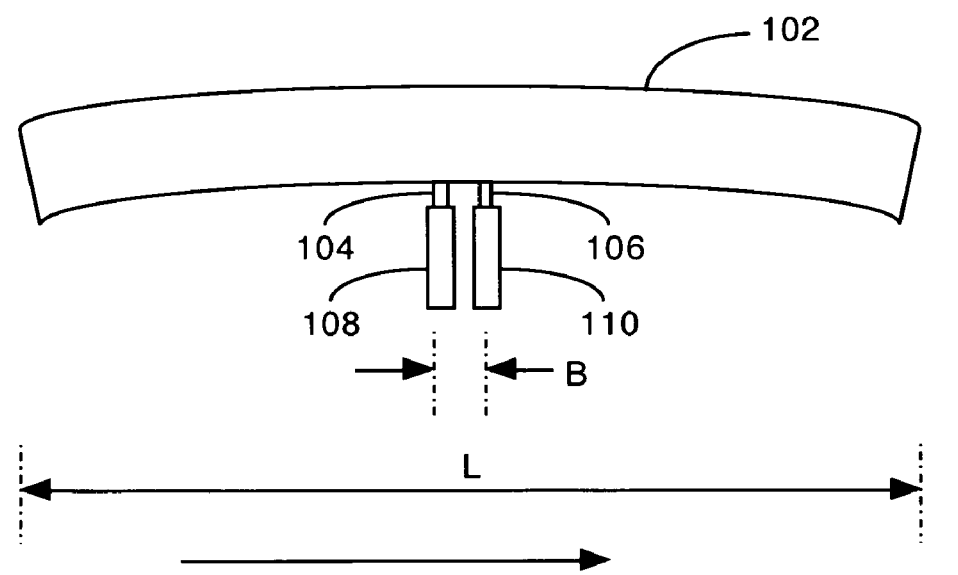
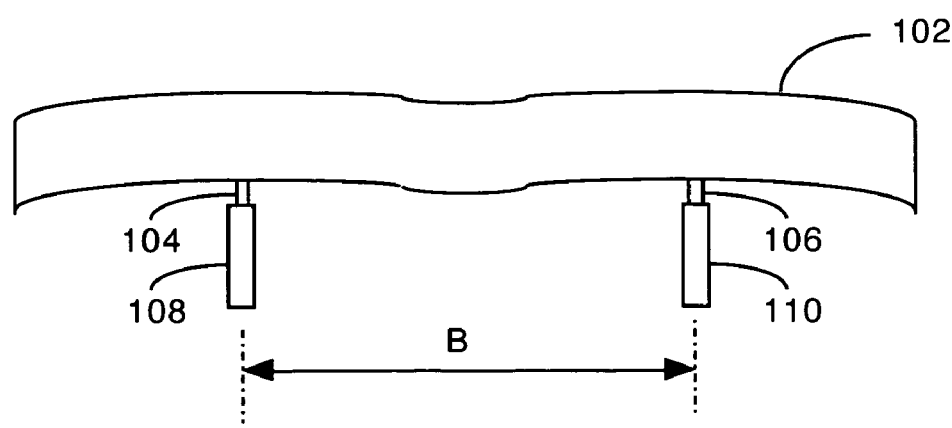
Figure 1B (Prior Art)

MOUNTING SYSTEM FOR OPTICAL FREQUENCY REFERENCE CAVITIES

PRIORITY

This application claims the benefit of U.S. Provisional Patent Application Nos. 60/711,955, filed Aug. 25, 2005, and 60/713,834, filed Sep. 2, 2005 and incorporates them herein by reference.

GOVERNMENT SUPPORT:

The present invention was made with government support as follows. NSF, Grant #s PHY00-96822, "the JLA Research Program in Atomic, Molecular, and Optical Physics", C. E. Wieman and W. C. Lineberger Office of Naval Research, N00014-02-1-0714, "Optical Atomic Clocks", Jun Ye NASA NAGS-10368, "Optical Local Oscillator with $1\times10^{-15}$ Frequency Stability", J. Hall and J. Ye, ended Feb. 14, 2004

BACKGROUND OF THE INVENTION

1. Field of the Invention

The present invention relates to techniques for mounting optical frequency reference cavities in such a manner as to reduce the effects of mechanical vibration.

2. Problems in the Art

A common method of achieving optical frequency stability in a laser is to use a laser whose output frequency can be tuned with a control signal, and to stabilize (servo-lock) the laser frequency to a mode (or resonance) of a passive cavity, called an optical frequency reference cavity. Compared to the laser cavity, the reference cavity can be made far more stable, since it has no gain medium. The reference cavity might be a Fabry-Perot cavity such as a high finesse two-mirror cavity with a spacer between the mirrors formed of low thermal expansion coefficient material.

A number of techniques have been used to make the reference cavity even more stable. For example, the reference cavity mounting might include vibration absorbing damping elements, acoustic vibration isolation, temperature stabilized housing, etc.

Methods such as mechanical isolation (on a heroic scale), low pass filtering, or active anti-vibration approaches are sufficiently productive such that, by now several groups have developed visible optical sources with ~Hz linewidths. Further progress has been very challenging—all the margins have been used up. In addition, the most successful approach, active anti-vibration techniques, is expensive and complicated to implement.

One of the present inventors conceived of an idea to mount a reference cavity vertically at a single central plane, rather than horizontally as is conventional. See J. L. Hall, "Frequency Stabilized Lasers: a parochial review," *Proceedings of the SPIE*, 1837, 2-15 (1993). A second of the present inventors built and experimented with such a system. See: "Cryogenic system for a sapphire Fabry-Perot optical frequency standard," Cryogenics 1996, Volume 36, Number 1, pp 13-16. However, the stability challenges that were caused by the single plane mounting were thought to be too large to overcome at that time. In addition, the mounting mechanism used a clamping collar, which, as it turned out, squeezed and distorted the spacer cylinder and degraded performance. Until the present invention was made, no one in the field of optical frequency reference cavities felt that the vertical orientation would be workable.

Thus, there exists a need for an alternative technique for stabilizing optical reference cavities, by mounting the cavities vertically at their horizontal geometrical midpoint.

SUMMARY OF THE INVENTION

An object of the present invention is to provide an alternative technique for stabilizing optical reference cavities, by mounting the cavities vertically at their horizontal geometrical midpoint.

By using vertical symmetry relative to the horizontal midplane of an optical cavity, even large vibration induced distortions of the cavity's spacer result in near-zero net change in the distance between the cavity mirrors. This results in a cavity that is almost immune to vibrations, and hence can be used to obtain ultra-narrow laser linewidth.

The present invention provides an alternative technique for stabilizing optical reference cavities. The technique is based upon an improved mounting method for the cavity, wherein the cavity is mounted vertically at its horizontal geometrical midplane. Horizontal geometrical midplane is defined herein as a plane perpendicular to the axis along which light propagates, wherein the portion extending above the plane is geometrically equivalent to the portion extending below the midplane. This means that the mass above the plane is equal to the mass below the plane, and it is similarly oriented. This can mean the portion above the midplane is symmetrical (except for angular rotation) to the portion below, or that the two portions have been adjusted to have the same effect in their deformation of the distance between the support point and mirror to an applied acceleration (for example by adding small weights further from the midplane) even with a small dissymmetry.

In one implementation, the cavity is suspended at this plane, outside and around the spacer cylinder, equidistant from the mirror ends of the cavity. The suspension element is a collar of an extremely low thermal expansion coefficient material (LTE material), which surrounds the spacer cylinder and supports it uniformly. The spacer is also formed an LTE material, usually the same one. Once the collar has been properly located, it is cemented in place (for example with RTV Silicone bond) so that the spacer cylinder is uniformly supported and does not have to be squeezed at all.

Alternative embodiments form the collar and the spacer as an integral element. Various changes to the reference cavity have also been made to optimize its use with the mounting scheme of the present invention. The cavity is made shorter and lighter, in order to improve stability with the central mounting orientation.

The collar is a disk formed of an exceptionally low thermal expansion coefficient material, which is heat-treated and annealed by the manufacturer to have a minimum expansion point at around the temperature at which the reference cavity will be used. The collar must be ground rather than molded to retain its low thermal expansion properties.

In addition to the central axial bore into which the spacer cylinder is fitted, one preferred embodiment of the collar includes a number of cavities partially bored into its lower flat surface, around the axial bore. These cavities are support points, into which mounting base pins will be inserted. Hence the collar is supported at a minimum of three points. In a preferred embodiment, the support cavities include a layer of indium at their bases to smooth and broaden the contact area between the pins and the collar. To equalize the weight above and below the midplane, a corresponding set of dummy holes are bored into the top surface of the disk, with this family of holes being rotated around the vertical axis (typically 60° offset, for three holes) to avoid collisions with the family of lower holes.

The mounting base might be an aluminum structure with a broad base and arms extending upward toward the collar, the arms ending in the support pins. Preferably, the support pins would be arising from a base also prepared from low expansion material.

In an alternative embodiment, holes can be drilled longitudinally from the end-faces of the extra-thick cylindrical cavity spacer, which also comprises the collar. These holes stop at a depth near the midplane, so that the supporting rods from below will provide the support again in the midplane, effectively preserving the upper/lower symmetry. For weight balance purposes, a corresponding set of dummy holes (normally unused) are prepared also in the top face, being rotated suitably around the longitudinal axis to provide an offset between the upper and lower hole systems.

Another useful variant is based on hanging the cavity from its symmetry plane by wires from above, rather than supporting it by rods from below. Again the weight-bearing points will be located essentially in the midplane of the cavity's vertical length. This variant facilitates use of additional vibration isolation within the vacuum housing, for example based on leaf springs, which would support the upper ends of the cavity support wires. Such leaf springs, as loaded by the cavity mass, will function as an in situ low pass filter for mechanical vibrations. Therefore, considering the low a priori vibration sensitivity achievable with the vertically-mounted cavity concept, it may be possible in some cases to dispense with any vibration reduction efforts external to the cavity's vacuum enclosure.

BRIEF DESCRIPTION OF THE DRAWINGS

FIGS. 1A and 1B (Prior Art) are simplified side-section diagrams illustrating the conventional horizontal mountings of optical frequency reference cavities.

DETAILED DESCRIPTION OF THE PREFERRED EMBODIMENTS

FIGS. 1A and 1B (Prior Art) are simplified side-section diagrams illustrating the conventional horizontal mounting of optical frequency reference cavities 102. Note that the diagrams are not to scale, but are exaggerated for clarity. Both show gravity induced sag of the structure perpendicular to the cavity axis. In the top diagram of FIG. 1A, cavity spacer 102 is supported in two places 104, 106 by, for example, V-blocks 108, 110 which are nearly adjacent (B=0.11L). Such a narrow spacing is chosen to reduce coupling of temperature induced length changes. Unfortunately, this orientation appears to be especially sensitive to vertical vibrations. In addition, the mirror faces on the ends are not parallel because of the bowing of spacer 102.

Figure 2:
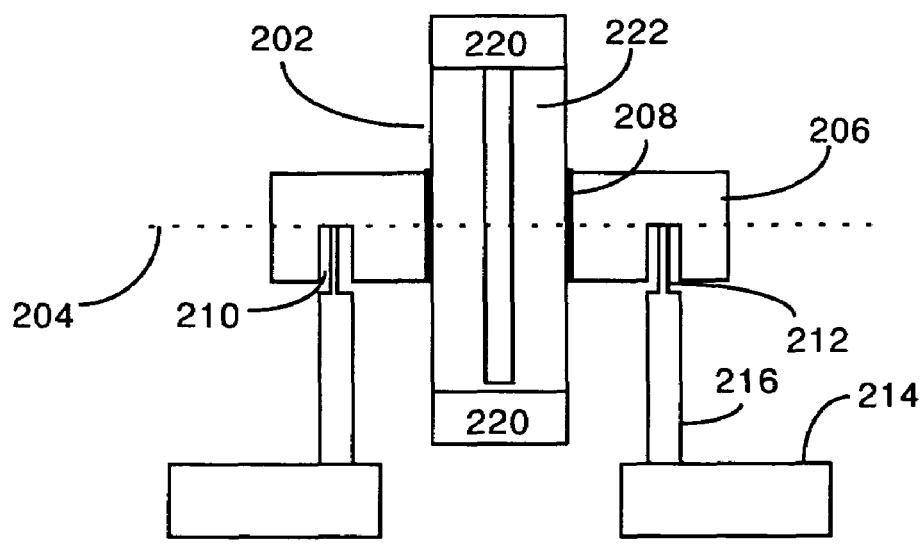
FIG. 2 is a simplified side-section diagram illustrating one preferred embodiment of the present invention, wherein the vertical reference cavity is mounted from below.

The lower diagram of FIG. 1B shows cavity spacer 102 supported in two places 104,106 by, for example, V-blocks 108, 110. V-blocks 108,110 are separated at a special value (B=0.577L), forming what is known as an "Airy" suspension configuration. This spacing results in the ends of the spacer bar being nominally parallel, and produces a large improvement by reducing conversion of vertical vibrations into frequency vibrations. A mechanical low pass filter (not shown) further reduces vibrations above around 30 Hz. With uniform support under the whole length of a horizontal cavity, we expect $$\frac{\delta f}{f} = -\frac{\delta L}{L} = \frac{\rho \sigma h}{2Y} a \tag{1}$$

where $\rho$ is the ULE density (2.21 gm/cm$^3$ in this experimental example), $\sigma$ is the Poisson ratio (~0.17), $\gamma$ is the Young's modulus (67 GPa), h is the bar's height, and a is the acceleration. This frequency/acceleration sensitivity evaluates to 90 kHz/ms$^{-2}$ predicted, vs ~150 kHz/ms$^{-2}$ observed with the Airy support. (Actually, the wider face of this ULE cavity rests in 4 places, provided by two heavy-wall O-rings at the Airy separation on each of two longitudinal supporting Zerodur rods of 25.4 mm diameter, 50 mm center/center spacing.) Again, transverse forces may play a role. For comparison, supporting via Vee-blocks near the bottom of a 100 mm diameter, 250 mm long interferometer gave an acceleration sensitivity near 180 kHz/ms$^{-2}$ FIG. 2 is a simplified side-section diagram illustrating one preferred embodiment of the present invention, wherein the reference cavity 202 (comprising end mirrors 220 and spacers 222) is vertically mounted via under-supports. This mounting scheme reduces acceleration sensitivity by design, utilizing vertical mounting to allow use of symmetry. The mounting occurs essentially at the geometrical midplane 204 crossing the longitudinal axis of the vertical cylindrical cavity 202, leading to equal but opposite length changes in the bottom and top halves and a net cavity end-to-end change of near zero. i.e., the distortions are not unusually small, but they are nearly matched, so that the net sensitivity is small. It can be further reduced by judicious placement of small weights or bores.

In some cases, offsetting the geometrical midplane of collar 206 from the geometrical midplane of cavity 202 very slightly (~0.1 mm) results in better performance than precise alignment. Generally speaking, the two midplanes should be aligned to within at least 1 mm.

For an acceleration along the cavity axis, each half of the cavity is deformed on either side of the central mounting plane. The decrease in length on one side of the mounting is mostly compensated for by an increase in length on the other. This design for a cavity support system is simple, robust, and offers reduced sensitivity to the cavity's length changes caused by acceleration. Therefore the vibration isolation requirements to achieve a particular performance are significantly reduced, resulting in a huge reduction of the overall system cost and complexity.

While the requirements on the mounting system are moderately stringent in terms of materials, centering accuracy, and dimensions, few, if any disadvantages are introduced.

The required mechanical precision can be estimated from the expression for axial compression, holding the cavity vertically—without symmetry—from one end alone $$\frac{\delta f}{f} = -\frac{\delta L}{L} = \frac{\rho L}{2Y}a \quad (2)$$

Compared with a horizontal orientation, this predicted sensitivity is larger by a serious factor, $L/(\sigma^*h)$, a factor of ~5x from dimensions and ~5x again from loss of the Poisson ratio. This scale is 28-fold larger (V vs H) for the cavity of FIG. 1. However, using the symmetry idea, in the machining of the structure we can expect a precision of about 0.1 mm out of 100 mm cavity length. This is an asymmetry factor of $\epsilon=2/1000$ in our favor. So a nominally-fabricated vertical cavity 202 should be able to give a sensitivity ~20x reduced from that calculated for horizontal use. The shortening to 100 mm cavity length is prudent relative to its weight, and also reduces the sensitivity.

An experimental trial used an available ULE cavity 202 of 50 mm length and 12.5 mm diameter, having a finesse ~46×$10^3$ and a linewidth of 65 kHz. This length approximates the height of our first cavity of FIG. 1, but we lose the favorable $\sigma=0.17$ factor in Eq. 1. Support at the vertical midplane 204 was approximated by mounting the cavity into a Zerodur disk 206, drilled to accept the cavity's diameter, plus a ¼ mm gap to be filled with silicone RTV adhesive 208. The length-wise centering was accurate to ~0.5 mm. The disk had been pre-drilled to its midplane from both faces to provide 2 sets of 3 holes 210 which could receive the 3 vertical mounting posts 212.

For convenience, the mounting base was formed from aluminum, and comprised a footing 214, and legs 216, leading to pins 212. In one embodiment, the pins are formed of a softer material such as Teflon.

With the lighter end of the cavity oriented up, one could add bits of In (indium) wire (not shown) on the top to increase the acceleration sensitivity of this less-sensitive half. In this way the coefficient could be trimmed from 18 to below 10 kHz/ms$^{-2}$ (observed at 1064 nm), limited by cross-coupling and in-equivalence of the PZT shakers used in the tests under each of the 3 legs. For comparison, Eqs. 1 and 2 predict 9.8 kHz/ms$^{-2}$ for horizontal and 232 kHz/ms$^{-2}$ for unsymmetrical vertical mounting (at 1064 nm). So even our imperfect mounting symmetry bought us a factor ~23x reduction of the nominal vertical acceleration sensitivity. Compared to the horizontally-mounted case, by "going vertical" we lose the $\sigma=0.17$ factor, and have a longer scale dimension along the cavity axis. Still, by use of more precise fabrication symmetry, we can win a better sensitivity reduction factor at a particular length, plus we have the ability to trim to even better reduction. Also the smaller cavity and vertical geometry is better for the dual-layer thermal controls that may be needed: available ULE normally needs to be cooled to reach the temperature where its length is thermally-stable, and the Peltier coolers need a big surface for their heatsink. Additionally, the vertical geometry can be used with a spherical or doubled-cone overall cavity shape which can provide a calculated further acceleration sensitivity reduction of about 3x relative to that of the full cylindrical spacer.

Preferably, the cavity spacer 222 and the collar 206 are formed of a low thermal expansion material. Low thermal expansion materials generally have a thermal expansion coefficient (TEC) of at least less than $10^{-7}K^{-1}$, and very low thermal expansion materials have TEC of less than $10^{-7}K^{-1}$. This latter performance is difficult to achieve and generally requires the use of a glass ceramic such as Zerodur which is heat treated and annealed, and then ground into its shape (molding reduces the TEC too much). This careful fabrication can result in a material with TEC very near 0 at the temperature of operation.

Figure 3:
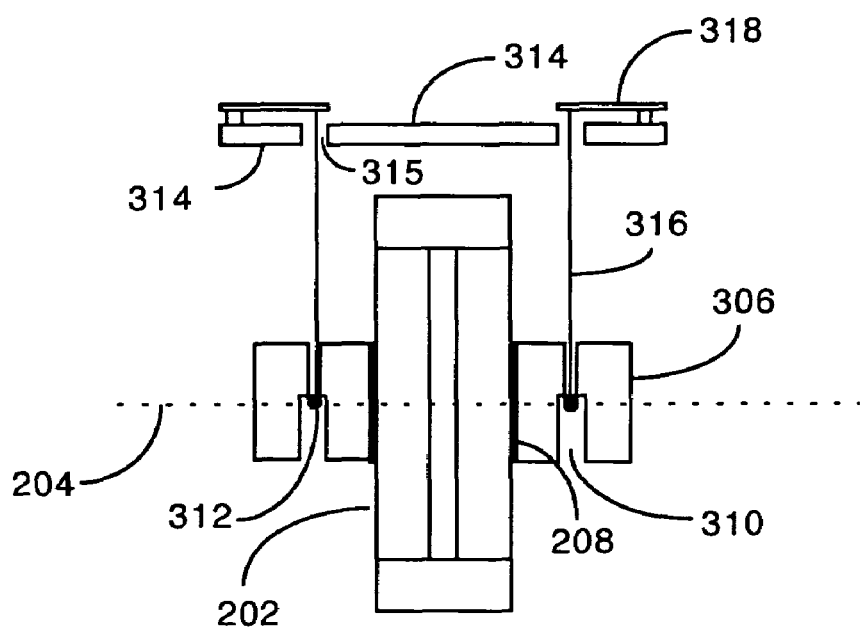
FIG. 3 is a simplified side-section diagram illustrating a second preferred embodiment of the present invention, wherein the vertical reference cavity is mounted from above.

FIG. 3 is a simplified side-section diagram illustrating a second preferred embodiment of the present invention, wherein the reference cavity 202 is vertically mounted from above. Many of the elements in this figure are the same as those of FIG. 3 and are numbered the same. Cavity 202 is still suspended vertically at its midplane 204. Disk 306 is similar to disk 206 of FIG. 2, except that bores 310 allow it to be suspended from wires 316 (rather that being supported by posts 212) so the holes 310 need to have a smaller diameter above (just for clearance of the wired diameter) and a larger diameter below, where the attachment is effected with a thicker retaining element 312 clamped onto the wire (retaining element 312 could be simply a blob of epoxy at the end of wire 316). Again collar 306 is supported at approximately its midplane.

Wires 316 are in turn suspended from support beam 314. Leaf springs 318 may be used to absorb vibration, as in FIG. 3. In this case, wires 316 pass through beam 314 via holes 315.

Figure 4:
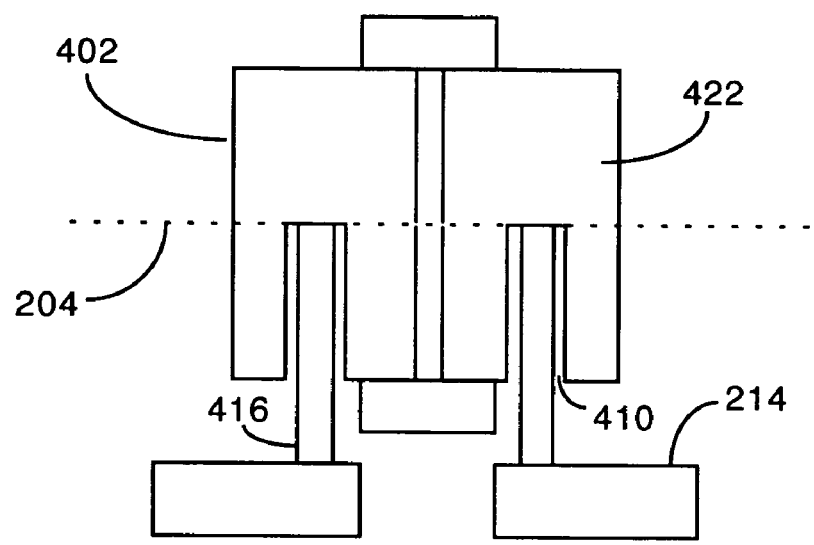
FIG. 4 is a simplified side-section diagram illustrating a third preferred embodiment of the present invention, wherein the vertical cavity is supported at its geometrical midplane vie holes drilled into the cavity spacer itself.

FIG. 4 is a simplified side-section diagram illustrating a third preferred embodiment of the present invention, wherein cavity 402 is supported at its geometrical midplane 204 via holes 410 drilled into the cavity spacer 422 itself. Hence spacer 422 also forms the collar in this embodiment. Spacer 422 is much thicker than in the previous embodiments, extending out far enough to allow room for bores to accommodate supports 416.

Figure 5:
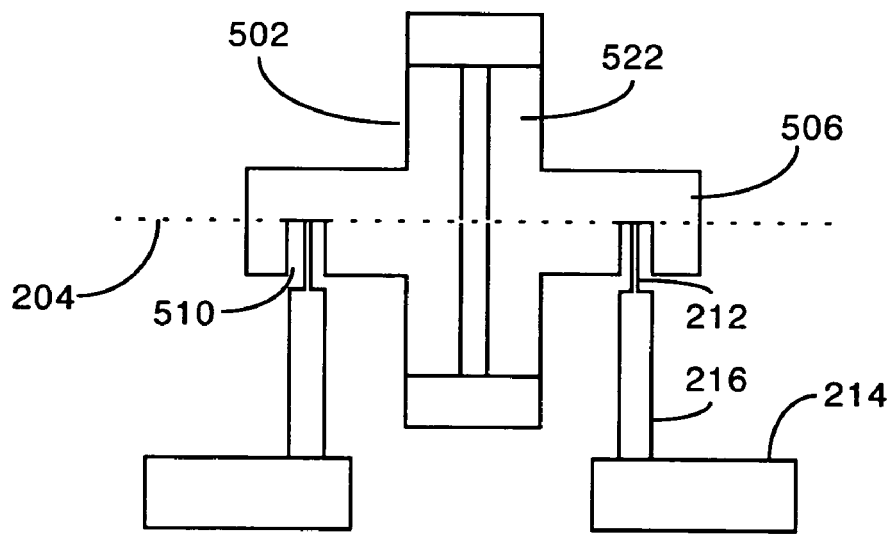
FIG. 5 is a simplified side-section diagram illustrating a fourth preferred embodiment of the present invention, wherein the collar supporting the vertical cavity is integral with the cavity.

FIG. 5 is a simplified side-section diagram illustrating a fourth preferred embodiment of the present invention, wherein collar 506 is an integral unit with cavity spacer 522. This embodiment is similar to that of FIG. 4 in that the cavity spacer is constructed to also form the collar for supporting the cavity. However, cavity 502 is shaped differently from cavity 402, because its collar 506 is disposed around only a central portion of the cavity. This allows for the use of less LTE material and shorter bores 510, but the shape is a bit more complex to fabricate. Note that the embodiments of FIGS. 4 and 5 could be adapted to suspended configurations if desired.

What is claimed is:

1. Apparatus for reducing the effects of vibration on a reference cavity having end mirrors and a spacer by mounting the cavity vertically and supporting the cavity at its geometrical horizontal midplane, the apparatus comprising:

a collar formed around the cavity spacer such that the geometrical horizontal midplane of the cavity is closely aligned with the geometrical horizontal midplane of the collar; and means for supporting the collar such that the cavity is suspended from the collar;

wherein the cavity spacer is formed of a low thermal expansion material;

wherein the collar is formed of a low thermal expansion material; and wherein the collar provides uniform symmetrical support to the cavity.

2. The apparatus of claim 1 wherein the collar is substantially vertically symmetrical except that features in the top half of the collar are rotated around the collar's axis from features on the bottom half of the collar.

3. The apparatus of claim 1 wherein the collar and the cavity spacer are an integrally formed element.

4. The apparatus of claim 1 wherein the collar is cemented to the cavity.

5. The apparatus of claim 4 wherein an RTV silicone bond cements the collar to the cavity.

6. The apparatus of claim 1 wherein the cavity spacer and the collar are formed of a material having a thermal expansion coefficient of under $10^{-7} K^{-1}$.

7. The apparatus of claim 1 wherein the cavity spacer and the collar are formed of a material having a thermal expansion coefficient of under $10^{-8} K^{-1}$.

8. The apparatus of claim 7 wherein the collar is formed of a glass ceramic material.

9. The apparatus of claim 8 wherein the collar material is heat treated and annealed.

10. The apparatus of claim 9 wherein the collar is formed via grinding the collar material.

11. The apparatus of claim 1 wherein the means for supporting the collar supports the weight of the collar from below.

12. The apparatus of claim 11 wherein the means for supporting the collar comprises:
    at least three holes formed in the underside of the collar;
    pins disposed within the holes and supporting the collar; and
    a base supporting the pins.

13. The apparatus of claim 12, further comprising holes formed in the top of the collar at an angular offset from the underside holes, such that the collar is substantially vertically symmetrical except for the angular offset.

14. The apparatus of claim 12 wherein the holes extend approximately to the centerplane of the collar.

15. The apparatus of claim 1 wherein the means for supporting the collar suspends the collar.

16. The apparatus of claim 15 wherein the means for supporting the collar comprises:
    support bores formed vertically through the collar, the support bores wider at the bottom than the top;
    wires having thicker retaining elements formed at their bottom ends, the wires threaded through the support bores such that the retaining elements are retained at catch points because of the narrowing of the support bores; and
    means for suspending the wires.

17. The apparatus of claim 16 further comprising dummy bores formed vertically through the collar, the dummy bores wider at the top than the bottom, such that the collar is substantially vertically symmetrical except for an angular offset between the top half of the collar and the bottom half of the collar.

18. The apparatus of claim 16 wherein the catch points are approximately at the horizontal geometrical midplane of the collar.

19. The apparatus of claim 1 wherein the geometrical horizontal midplane of the collar is aligned to the geometrical horizontal midplane of the cavity to within 1 mm.

20. The apparatus of claim 1 wherein the geometrical horizontal midplane of the collar is offset from the geometrical horizontal midplane of the cavity by about 0.1 mm.

21. The method of reducing the effects of vibration on a reference cavity having end mirrors and a spacer comprising the steps of:
    forming the cavity spacer of a low thermal expansion material;
    orienting the cavity vertically; and
    supporting the cavity at its geometrical horizontal midplane, wherein the supporting step is accomplished by—
        forming a collar of low thermal expansion material around the cavity spacer such that the geometrical horizontal midplane of the cavity is closely aligned with the geometrical horizontal midplane of the collar; and
        supporting the collar such that the cavity is suspended from the collar.

22. The method of claim 21 wherein the wherein the cavity spacer forming step forms the cavity spacer of a material having a thermal expansion coefficient of under $10^{-7} K^{-1}$ and the collar forming step forms the collar of a material having a thermal expansion coefficient of under $10^{-7} K^{-1}$.

23. The method of claim 21 wherein the wherein the cavity spacer forming step forms the cavity spacer of a material having a thermal expansion coefficient of under $10^{-8} K^{-1}$ and the collar forming step forms the collar of a material having a thermal expansion coefficient of under $10^{-8} K^{-1}$.

24. The method of claim 21 wherein the collar forming step includes the step of forming the collar of a glass ceramic material.

25. The method of claim 24 wherein the collar forming step includes the step of heat treating and annealing the collar material.

26. The method of claim 25 wherein the collar forming step includes the step of grinding the collar material.

27. The method of claim 21 wherein the collar forming step includes the step of making the collar substantially vertically symmetrical except that features in the top half of the collar are rotated around the collar's axis from features on the bottom half of the collar.

* * * * *